(12) United States Patent
Kline

(10) Patent No.: US 7,845,881 B2
(45) Date of Patent: Dec. 7, 2010

(54) METHOD AND APPARATUS FOR THE MAINTENANCE OF PIPELINES

(75) Inventor: Shlomo Kline, Tel Aviv (IL)

(73) Assignee: Kline Tsaneret Delek Ltd., Holon (IL)

( * ) Notice: Subject to any disclaimer, the term of this patent is extended or adjusted under 35 U.S.C. 154(b) by 469 days.

(21) Appl. No.: 11/773,785

(22) Filed: Jul. 5, 2007

(65) Prior Publication Data

US 2008/0069645 A1    Mar. 20, 2008

Related U.S. Application Data

(63) Continuation-in-part of application No. 10/296,267, filed on Mar. 5, 2003, now abandoned.

(30) Foreign Application Priority Data

May 21, 2000    (IL)    ........................................ 136255

(51) Int. Cl.
     *F16L 1/024*      (2006.01)
(52) U.S. Cl. ................... 405/184.4; 405/154.1
(58) Field of Classification Search ................ 294/67.4, 294/86.4; 414/745.4, 745.5, 745.6, 746.8; 248/49; 138/108; 405/154.1, 158, 168.1, 405/173, 184.4, 184.5, 184.1, 174, 178
See application file for complete search history.

(56) References Cited

U.S. PATENT DOCUMENTS

| | | | |
|---|---|---|---|
| 3,267,682 | A | 8/1966 | Robley |
| 3,578,233 | A | 5/1971 | Meister et al. |
| 4,203,687 | A | 5/1980 | Sumner |
| 4,218,044 | A | 8/1980 | Ikhsanov et al. |
| 4,218,158 | A | 8/1980 | Tesson |
| 4,229,121 | A | 10/1980 | Brown |
| 4,268,190 | A | 5/1981 | Tesson |
| 4,315,702 | A | 2/1982 | Moe et al. |
| 4,898,497 | A | 2/1990 | Behr |
| 5,385,609 | A | 1/1995 | Rose et al. |
| 7,278,613 | B2 * | 10/2007 | Roy ............................ 248/49 |

FOREIGN PATENT DOCUMENTS

JP      56120493 A    *    9/1981

* cited by examiner

*Primary Examiner*—Sunil Singh
(74) *Attorney, Agent, or Firm*—Hodgson Russ LLP

(57) ABSTRACT

Method and apparatus for the maintenance of pipelines. The method includes selecting a number of points along the pipeline and raising the pipeline at these points by an amount that the height difference between these points does not exceed the international flexibility standards. The apparatus includes at least one lifting frame, telescopic lifting arms and a flexible device connected to the lifting arms for engaging the pipeline.

7 Claims, 11 Drawing Sheets

METHOD AND APPARATUS FOR THE MAINTENANCE OF PIPELINES

CROSS REFERENCE TO RELATED APPLICATIONS

This application is a Continuation-In-Part of U.S. patent application Ser. No. 10/296,267 (filed Mar. 5, 2003) now abandoned, which is derived from International Patent Application PCT/IL01/00442 (filed May 17, 2001).

FIELD OF THE INVENTION

This invention refers to a method for carrying out the maintenance of pipelines used to transport products such as fuel, gas or hazardous liquids and to an apparatus for carrying out said method.

BACKGROUND OF THE INVENTION

Pipelines used to transport products such as fuel, gas or hazardous liquids, particularly fuel pipelines, require periodic maintenance which involves cleaning their outer surfaces and providing them with protective coating, e.g., coating for protecting the outer surfaces of the pipes from corrosion. Since these pipelines reach thousands of kilometers in length, the maintenance is effected in stages, viz. successively on sections thereof, which have a length in the order of tens of meters. Each section is subjected to maintenance at intervals of a few years, but in view of the great length of the pipelines, the overall maintenance operations are extremely heavy and costly.

Currently, each pipeline section is exposed by digging at the sides and under the pipeline, to distance the outer surfaces of the pipes from the surrounding ground sufficiently to permit to carry out on said outer surfaces the required maintenance operations. In many cases, the pipeline is laid in or crosses hard ground, such as rock formations, which is very difficult to dig out, and requires lengthy and expensive operations. It will be appreciated that while the ground may have been comminuted to some extent on the sides, when a trench was dug for the laying of the pipeline, the bottom of the trench is intact and can be formed by a hard rock mass. In addition, digging underneath the pipeline in any ground type will compromise the integrity of the trench bed and additional costs are incurred in restoring the trench bed to a state suitable for supporting the pipeline. So far, no method or apparatus is known in the art that will overcome these difficulties and render the maintenance of the pipelines easier and more economical. More specifically, no method or apparatus is known that will permit to avoid having to dig below the pipeline, often into hard rock beds.

It will be appreciated that any damage to a pipeline, involving failure thereof and spillage of the transported liquid, would constitute, apart from the economical damages, a major economical disaster, and therefore those responsible will never carry into practice a maintenance method that involves even a very small probability of such damage and failure.

U.S. Pat. No. 4,218,044 describes a pipeline lifting device which comprises a detachable sling consisting of an upper part and a lower part. The upper part carries a self-propelled trolley. The lower part of the sling is articulated by rings with mutually articulated, supporting shoes. The shoes are moved by hydraulic cylinders. Both parts of the sling are interconnected with each other by projections and slots. In order to operate the device, a pit is dug of a sufficient size for accommodating the said lower part of the sling. Said lower part is placed on the pipeline and then turned around it for putting it on the bottom of the ditch. The self-propelled trolley is moved along the pipeline until the said upper part of the sling is engaged with the lower part. Then the hydraulic cylinders can be actuated to lift the pipeline. Since the bottom of the pipeline has a vertical spacing from the bottom of the ditch before the pipeline is lifted, the ditch cannot be so long that said vertical spacing be such as to damage the integrity of the pipeline. When the pipeline is lifted, the amount of the lifting is added to the said vertical spacing. As a result, the length of the ditch, along which maintenance can be carried out, is limited, this device only permits maintenance of a short length of the pipeline at a time. Additionally, its operation requires an initial digging underneath the pipeline, with the drawbacks hereinbefore set forth. Therefore this device is of limited, if any, value.

It is therefore a purpose of this invention to provide a method that will permit to avoid digging under the pipeline into the trench bed, particularly when it is hard rock bed.

It is another purpose of the invention to provide such a method that avoids with absolute certainty any damages to the pipeline, that might result in failure thereof.

It is a further purpose of this invention to provide such a method which involves considerable savings in terms of time and costs in the maintenance of pipelines.

It is a still further purpose of this invention to provide an apparatus for carrying out the aforesaid method.

It is a still further purpose of this invention to provide such an apparatus which is error-proof, so that it eliminates any danger of damage or failure of the pipeline as a consequence of the maintenance operations.

It is a still further purpose of this invention to provide such an apparatus that can be easily transported from section to section of the pipeline.

It is a still further purpose of the invention to provide such an apparatus that can be easily operated by workers who have no particular skill.

Other purposes and advantages of the invention will appear as the description proceeds.

SUMMARY OF THE INVENTION

In order fully to understand the invention, it must be recalled that pipelines have a certain flexibility which, small as it is, can result in significant bending over length of pipeline of tens of meters. International standards limit the permissible degree of bending in a very strict manner to assure that it should not be so great as to create a danger to the integrity of the pipeline. For example, such standards permit vertically to displace a cross-section of a standard fuel 42" pipeline by up to and no more than 22 cm over a length of 30 meters. This means that if one cross-section of the pipeline is kept still, another cross-section which is spaced from the first one by 30 meters may be raised, without danger of failure or damage to the pipeline by up to and no more than 22 cm. The following description will be based on these numerical data, but it should be understood that this is done by way of illustration, and that while those data are the usual ones and are assumed in the embodiments of the invention to be described, they do not constitute a limitation. Therefore, the invention might be carried into practice on a 42" fuel pipeline by effecting vertical displacements different from 22 cm over lengths of pipeline different from 30 meters, provided that the ratio between the vertical displacement and the pipeline length is such as to be permitted by the international standards and such as not to exceed what is permitted by the elasticity of the pipeline. Likewise, different ratios of vertical displacement to pipeline length are permissible for different pipeline, depending on their structure and dimensions.

The method according to the invention for effecting maintenance of pipelines comprises selecting a number of points along the pipeline and raising the pipeline at these points by an amount that the height difference between these points does not exceed the international flexibility standards. More specifically, in a preferred embodiment, the segment of a standard 42" fuel pipeline selected is 30 meters long and the extent to which the terminal cross-section is raised is not more and preferably close to 22 cm. The initial cross-section of the selected segment rests on the bed of the trench because of its weight and no action is required to cause this to occur. Therefore, if a cross-section of pipeline is raised by more than what is permitted by the international standards, which reflect the typical elasticity of pipelines, there is danger that the pipeline will fail and the transported liquid will spill out. Presently, said standards allow a standard 42" fuel pipeline cross-section to be raised by no more than 22 cm. Raising a cross-section by said amount, will cause the pipeline to bend upwards over a length of 30 meters.

Maintenance of a given pipeline segment requires a clearance on all sides, typically a clearance of 63 cm for a standard 42" fuel pipeline. Thus, the maintenance of a pipeline according to the invention is a multi-step process, as schematically illustrated by way of example in FIGS. 8a to 8e. After exposure, the pipe is initially raised at one point by 22 cm (FIG. 8a), by means of a lifting apparatus not shown in the drawings and hereinafter described, and a support, schematically indicated at 90, the preferred structure of which will be described hereinafter, is placed thereunder. The lifting apparatus is then relocated to another point and the pipe is there raised by 22 cm (FIG. 8b). The second point will be at most 30 m distant so that the length of pipe suspended between the two supports can bear its own weight without being structurally compromised. This is repeated three times so that the pipeline segment is raised at six points along its length (FIG. 8c). The pipe is then raised by another 22 cm at each of the four inner points (ii, iii, iv, v) and additional supports are stacked onto those already present at the aforesaid points (FIG. 8d). The lifting and supporting procedure is repeated at the two innermost points (iii, iv), yielding a situation where the middlemost pipe segment is suspended by no more than 66 cm above the trench bottom (FIG. 8e). Maintenance can then be performed on that segment. When maintenance is completed, the pipe can be lowered by reversing the raising procedure.

A method for the maintenance of pipelines according to one embodiment of the invention, which includes lifting a pipeline, comprising the following steps:

a) selecting a permissible vertical displacement value of points to be lifted along a given exposed pipeline, through which a hazardous fluid flows or is capable of flowing, in accordance with a suitable flexibility standard for the diameter, strength and weight of said pipeline, such that the difference in height of any two adjacent lifted points is less than said selected permissible vertical displacement value, and thereby obtaining a maximum longitudinal dimension between two adjacent points of said pipeline;

b) selecting a desired length of a pipe segment to be lifted to a maximum extent;

c) selecting a desired total vertical displacement to which said selected pipe segment length is to be lifted to said maximum extent;

d) determining a first number of required lifting points within said selected pipe segment length, said first number being equal to the smallest integer greater than the ratio between said selected pipe segment length and said maximum longitudinal dimension;

e) determining a second number of required lifting points external to said selected pipe segment length in each longitudinal direction, said second number being equal to the smallest integer greater than, or equal to, the ratio between said selected total vertical displacement and said permissible vertical displacement value, reduced by 1;

f) displacing a pipeline lifting apparatus to a first extreme lifting point, said first extreme lifting point being disposed at a distance, in a first longitudinal direction from said selected pipe segment, equal to the product of said second number and said maximum longitudinal dimension;

g) lifting said pipeline at said first extreme lifting point by said selected vertical displacement value and inserting a support thereat;

h) displacing said lifting apparatus to a lifting point for a distance equal to said maximum longitudinal dimension towards a second extreme lifting point, said second extreme lifting point being disposed at a distance, in a second longitudinal direction from said selected pipe segment, equal to the product of said second number and said maximum longitudinal dimension;

i) lifting said pipeline at said lifting point by said selected vertical displacement value and inserting a first suitable stackable support thereat;

j) performing steps h) and i) for a total number of lifting points equal to a sum of said first number and twice said second number until a support is inserted at said second extreme lifting point;

k) if said second number is greater than, or equal to, 1, displacing said lifting apparatus to a second pass lifting point for a distance equal to said maximum longitudinal dimension towards said first extreme lifting point;

l) lifting said pipeline at said second pass lifting point and inserting a second suitable stackable support thereat under said first support;

m) performing steps k) and l) for a total number of second pass lifting points equal to the greatest integer greater than, or equal to, a sum of said first number and twice said second number, reduced by two;

n) if said second number is greater than, or equal to, 2, displacing said lifting apparatus to a third pass lifting point for a distance equal to said maximum longitudinal dimension towards said second extreme lifting point;

o) lifting said pipeline at said third pass lifting point and inserting a third suitable stackable support thereat under said second support;

p) performing steps n) and o) for a total number of third pass lifting points equal to the greatest integer greater than, or equal to, a sum of said first number and twice said second number, reduced by four;

q) if said second number is greater than, or equal to, 3, displacing said lifting apparatus to a fourth pass lifting point for a distance equal to said maximum longitudinal dimension towards said first extreme lifting point;

r) lifting said pipeline at said fourth pass lifting point and inserting a fourth suitable stackable support thereat under said third support; and s) performing steps q) and r) for a total number of fourth pass lifting points equal to the greatest integer greater than, or equal to, a sum of said first number and twice said second number, reduced by six.

It is clear to one skilled in the art that this method can be continued along the pipeline section that is to undergo maintenance by carefully raising and lowering the pipeline segments and adding or removing the pipeline supports. It is equally clear that the procedure is only one of many possibilities of combining the raising, supporting and lowering steps to perform maintenance along the pipeline. One variation might be to raise long sections of the pipeline to a height sufficient to perform maintenance.

The values of 30 meters and 22 cm reflect the present international standards, and would be changed if such standards were changed, based on a different evaluation of the pipelines elasticity. Likewise, different figures would apply to different pipelines.

Preferably, the method according to the invention also comprises supporting the pipeline, which is subjected to maintenance, on the sides thereof against the sides of the trench, so as to maintain it in the desired alignment.

More particularly, the method of the invention preferably comprises tightly engaging the bottom of a cross-section or a short length of the pipeline, which is to be raised, with raising means, so as to establish an initial or reference vertical position of said cross-section, and then actuating the raising means to effect a predetermined lifting of said cross-section or short length, for a standard 42" fuel pipeline being typically by 22 cm for each length of pipeline of 30 meters.

The apparatus according to the invention comprises:
  a) at least one lifting frame, having telescopic legs and a transverse top beam;
  b) telescopic lifting arms supported in said top beam;
  c) flexible means connected to said lifting arms for engaging the bottom of the pipeline;
  d) first hydraulic means for telescopically extending and retracting said legs of the lifting frame;
  e) second hydraulic means for telescopically extending and retracting said lifting arms, wherein said frame is displaceable to a plurality of points along said pipeline, such that at each of said points the pipeline is lifted upon actuation of said first and second hydraulic means so that the difference of the heights of any two adjacent points is not so great as to create a danger to the integrity of the pipeline.

Preferably, said first hydraulic means have a limited power so that they can exert only the force required for placing the frame in the desired configuration with respect to the trench bed, but cannot exert a force sufficient to raise the pipeline; whereas said second hydraulic means have sufficient power to exert the force required to lift the pipeline.

Further, said second hydraulic means have a limited stroke and, when actuated, will retract the lifting arms and therefore raise the pipeline by the exact predetermined amount permitted by the international flexibility standards, typically 22 cm.

In a preferred embodiment of the invention, the apparatus comprises two parallel frames, each comprising the aforesaid elements, so as to exercise the lifting action on a short length of pipeline comprised between the two parallel frames.

In one embodiment, the invention is directed to a pipeline support system for supporting a pipeline through which a hazardous fluid flows or is capable of flowing during pipeline maintenance. The pipeline support system comprises a plurality of stackable supports insertable under corresponding lifting points of a pipeline so that maintenance can be performed on a segment of said pipeline between two lifting points, each adjacent pair of said lifting points being separated by a maximum longitudinal dimension in accordance with a suitable flexibility standard for the diameter, strength and weight of said pipeline.

The number of required lifting points within a selected pipeline segment length is a first number equal to the smallest integer greater than the ratio between said selected pipeline segment length and said maximum longitudinal dimension between adjacent lifting points.

The difference in height between any two adjacent points is less than a permissible vertical displacement value in accordance with said flexibility standard.

The total number of lifting points for a first level of supports is equal to the sum of said first number and twice a second number of required lifting points external to said selected pipe segment length in each longitudinal direction, said second number being equal to the smallest integer greater than, or equal to, the ratio between a selected total vertical displacement and said permissible vertical displacement value, reduced by 1, a corresponding stackable first level support being inserted under each of said lifting points after being lifted said permissible vertical displacement value by a lifting apparatus.

The system preferably comprises several stackable sections, so that they can be placed under the pipeline successively as the pipeline is gradually lifted.

Also preferably, the system comprises lateral supports adapted to be placed on the sides of the pipeline and to be operatively connected thereto by flexible means, said supports being provided with extendable arms for engaging the sides of the trench, so as to determine the distances between said sides and the pipeline and therefore guaranteeing the desired alignment of the pipe.

Preferably, two parallel and equal lifting frames are connected to one another and are attached to a common hook or like element for lifting them and transferring them from one location to another.

BRIEF DESCRIPTION OF THE DRAWINGS

The invention is illustrated in the drawings in which like reference characters designate the same or similar parts throughout the figures of which.

DETAILED DESCRIPTION OF PREFERRED EMBODIMENTS

Figure 1:
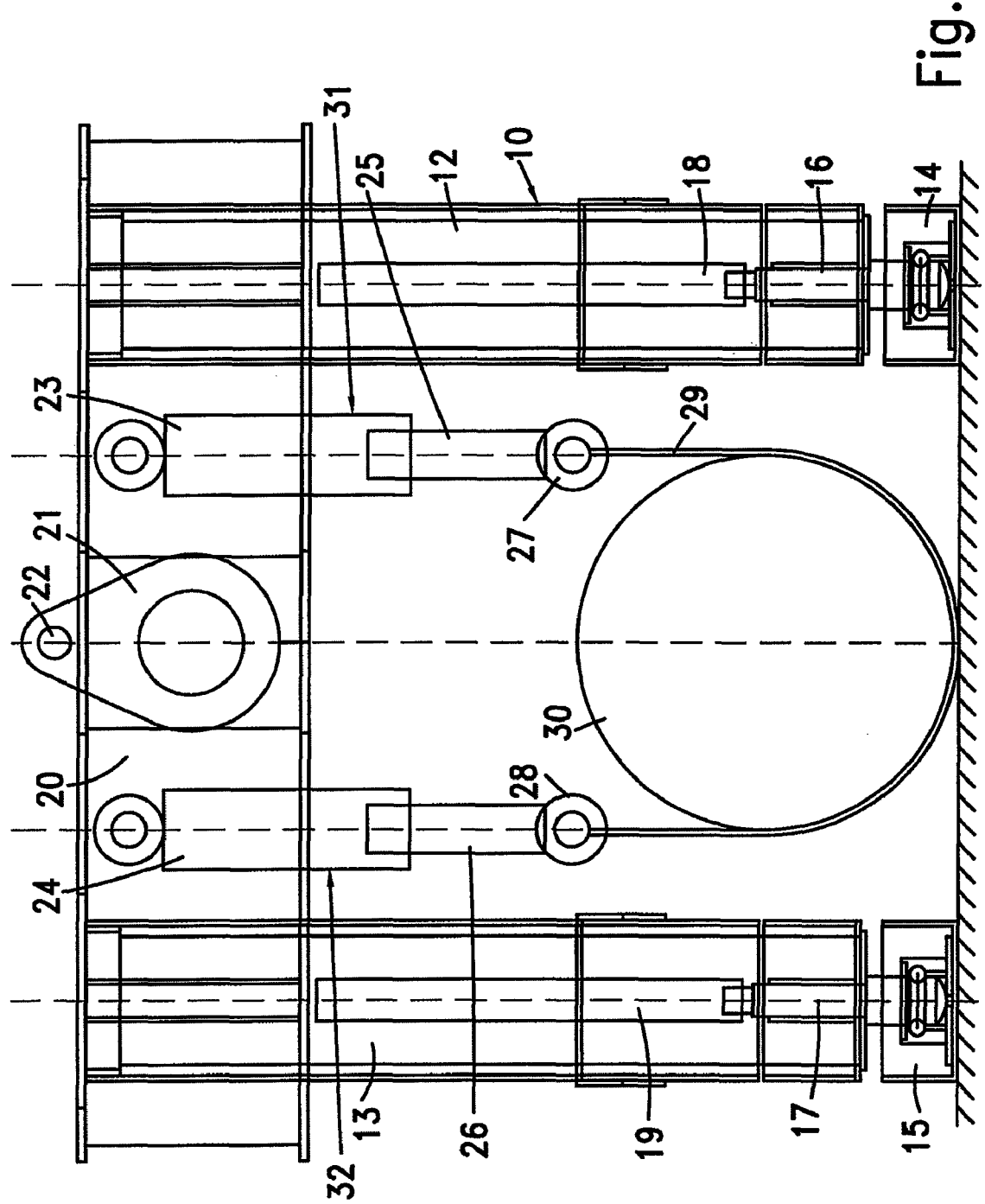
FIG. 1 is a schematic vertical view of an apparatus according to an embodiment of the invention, seen from a plane perpendicular to the axis of the pipeline.
Figure 2:
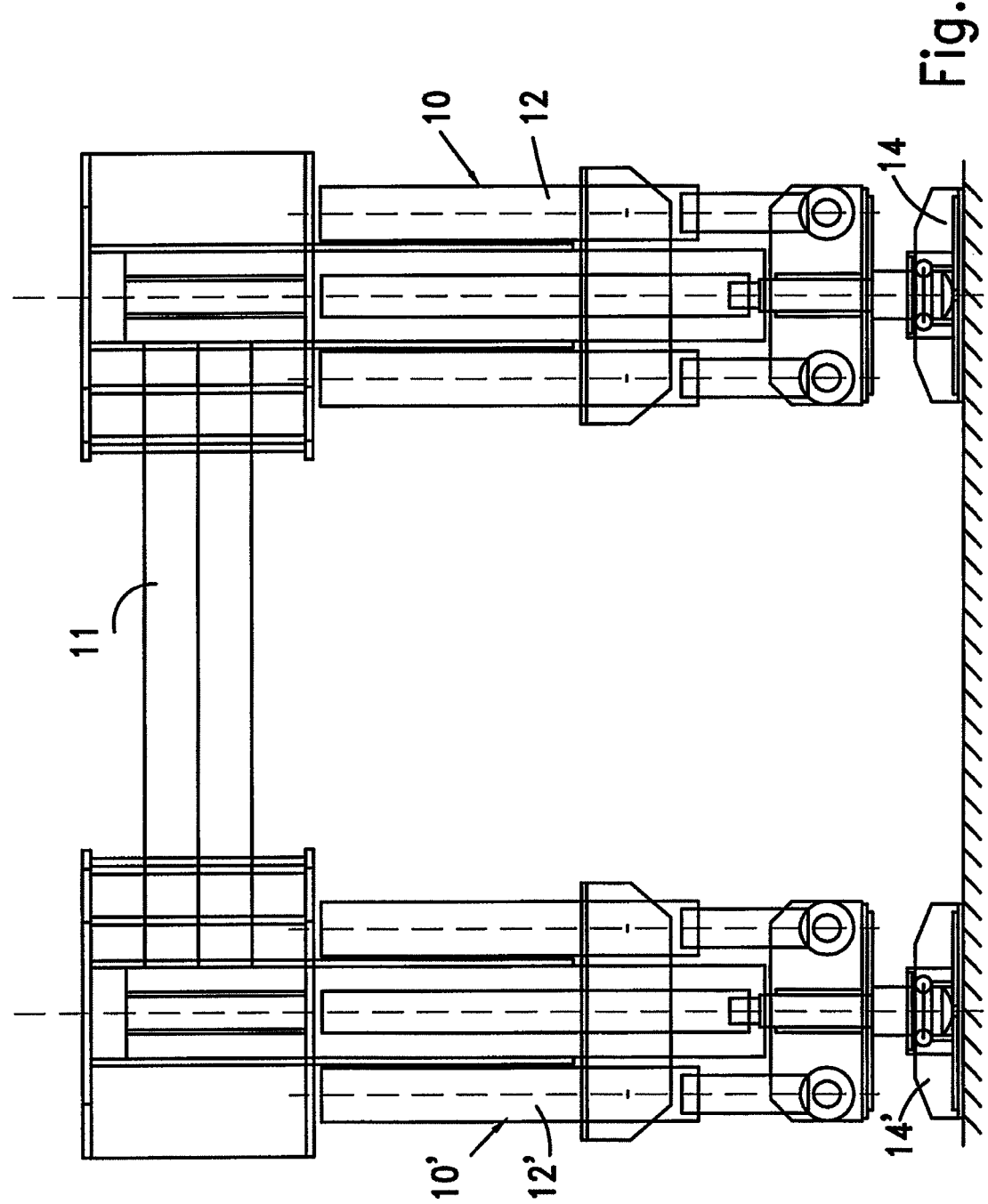
FIG. 2 is a schematic vertical view of the same apparatus, seen from a plane parallel to the axis of the pipeline.
Figure 3:
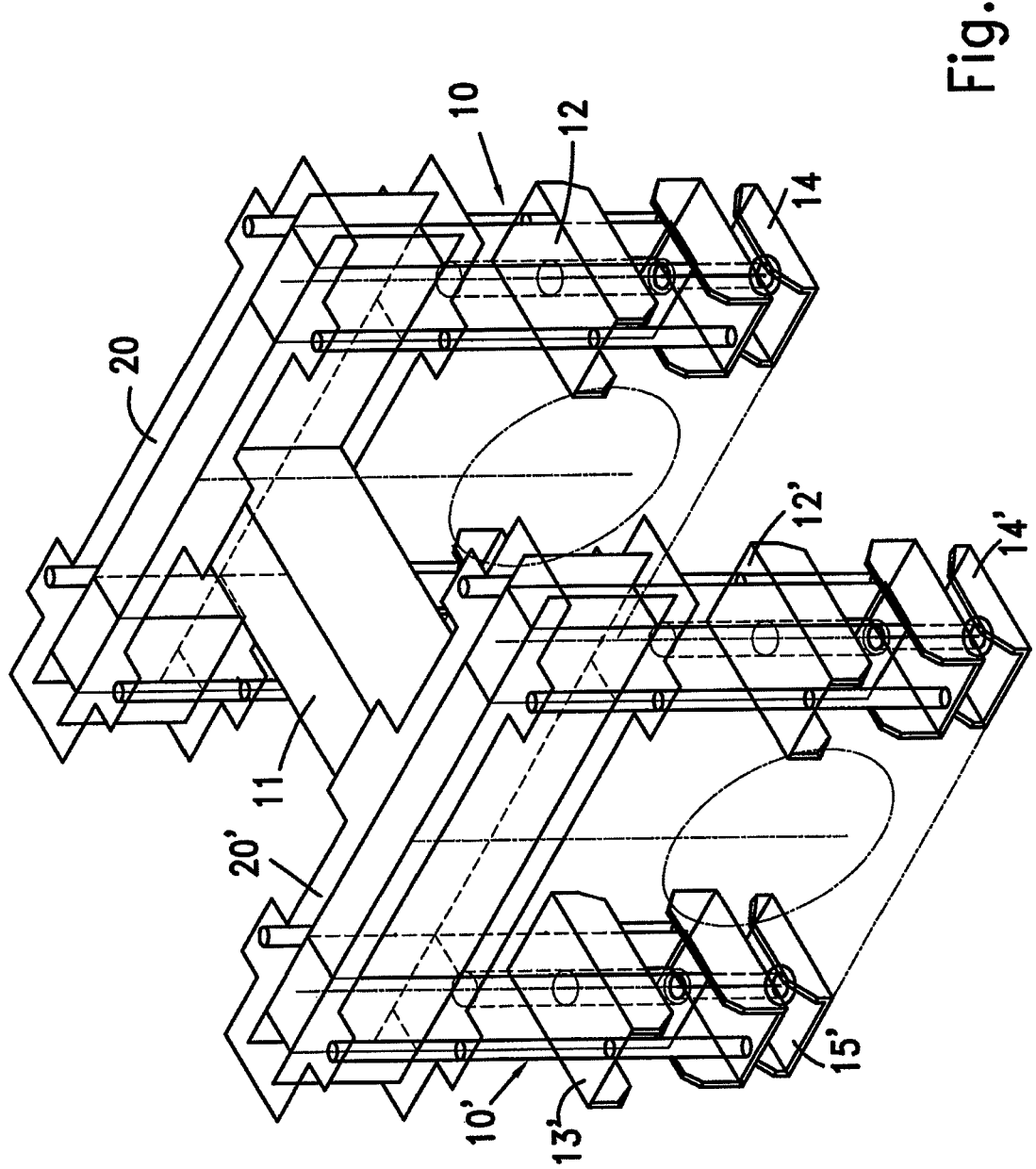
FIG. 3 is a schematic perspective view of the same apparatus.

The lifting apparatus according to the invention, as schematically illustrated in FIGS. 1-3, comprises in the embodiment illustrated two lifting frames that are equal and parallel to each other, and that are generally indicated at 10 and 10'. They are interconnected by a beam 11. When the apparatus is placed in the pipeline trench, the frames are perpendicular to the trench and consequently the beam 11 is parallel to the trench. In the following description, for clarity's sake, the term "longitudinal" will mean approximately parallel to the axis of the trench and the term "transverse" will mean approximately perpendicular to the axis of the trench. One of the frames (frame 10) is shown in vertical view in FIG. 1. It comprises two telescopic legs 12 and 13. Each leg rests on a foot, 14 and 15 respectively, to which are connected pistons 16 and 17 respectively, actuated by hydraulic systems schematically indicated at 18 and 19 respectively. Legs 12 and 13 are connected by a transverse beam 20 to which may be connected a link 21 having an opening 22 for lifting the frame by means of a crane. The crane will be equipped with lifting fingers, not illustrated, that concurrently seize link 21 of frame 10 and the corresponding link 21', not visible in the drawings, of frame 10', to lift the entire apparatus as a single body. Such crane operations are conventional and need not be further described or illustrated.

Figure 6:
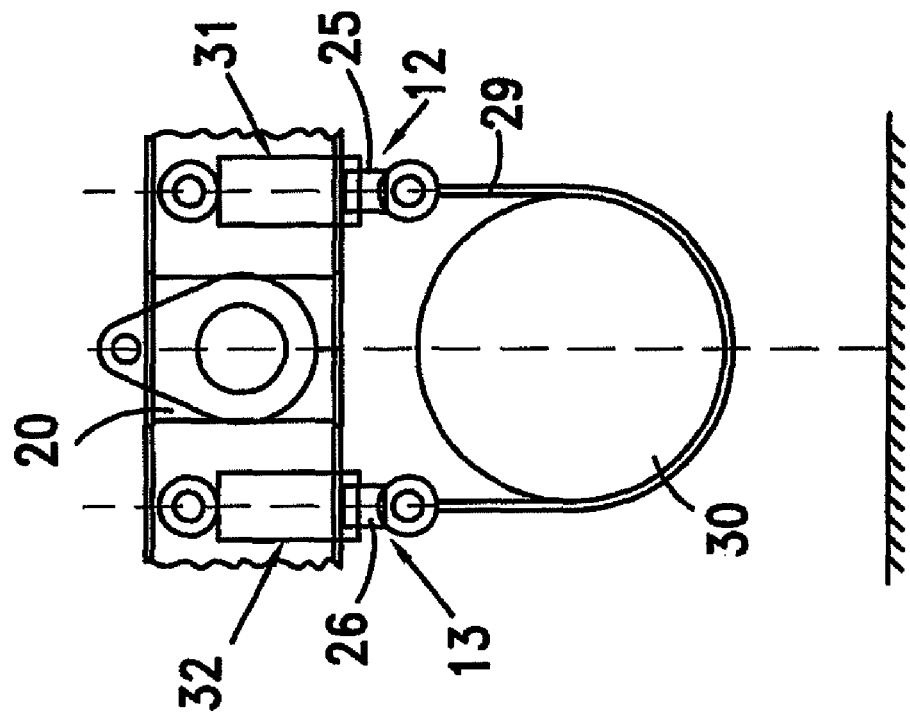
FIGS. 5 and 6 schematically illustrate two stages of the lifting of the pipeline.
Figure 5:
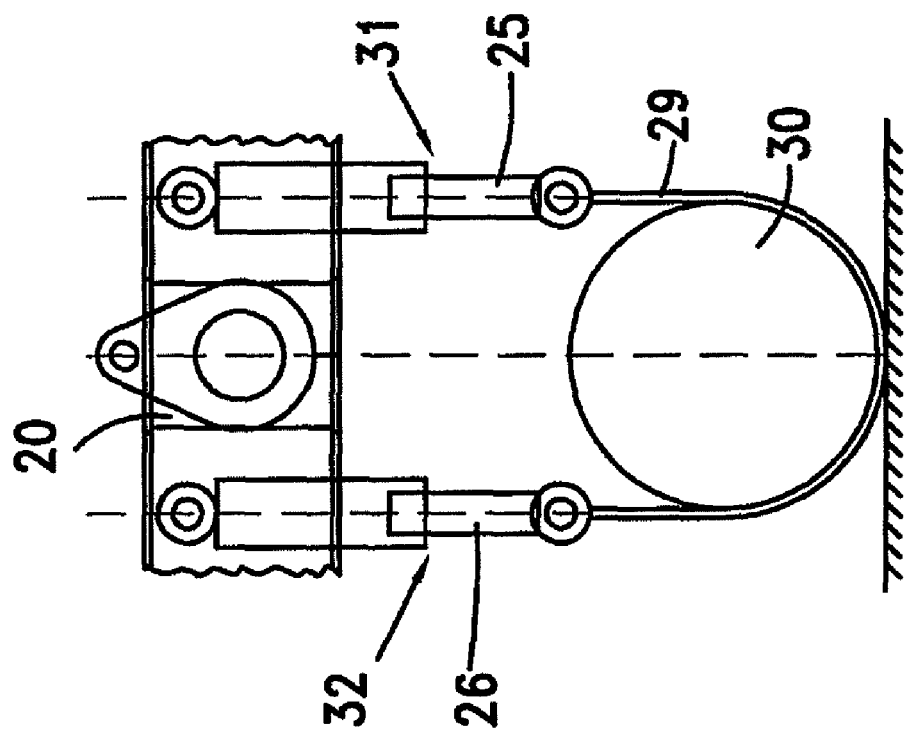
Figure 7:
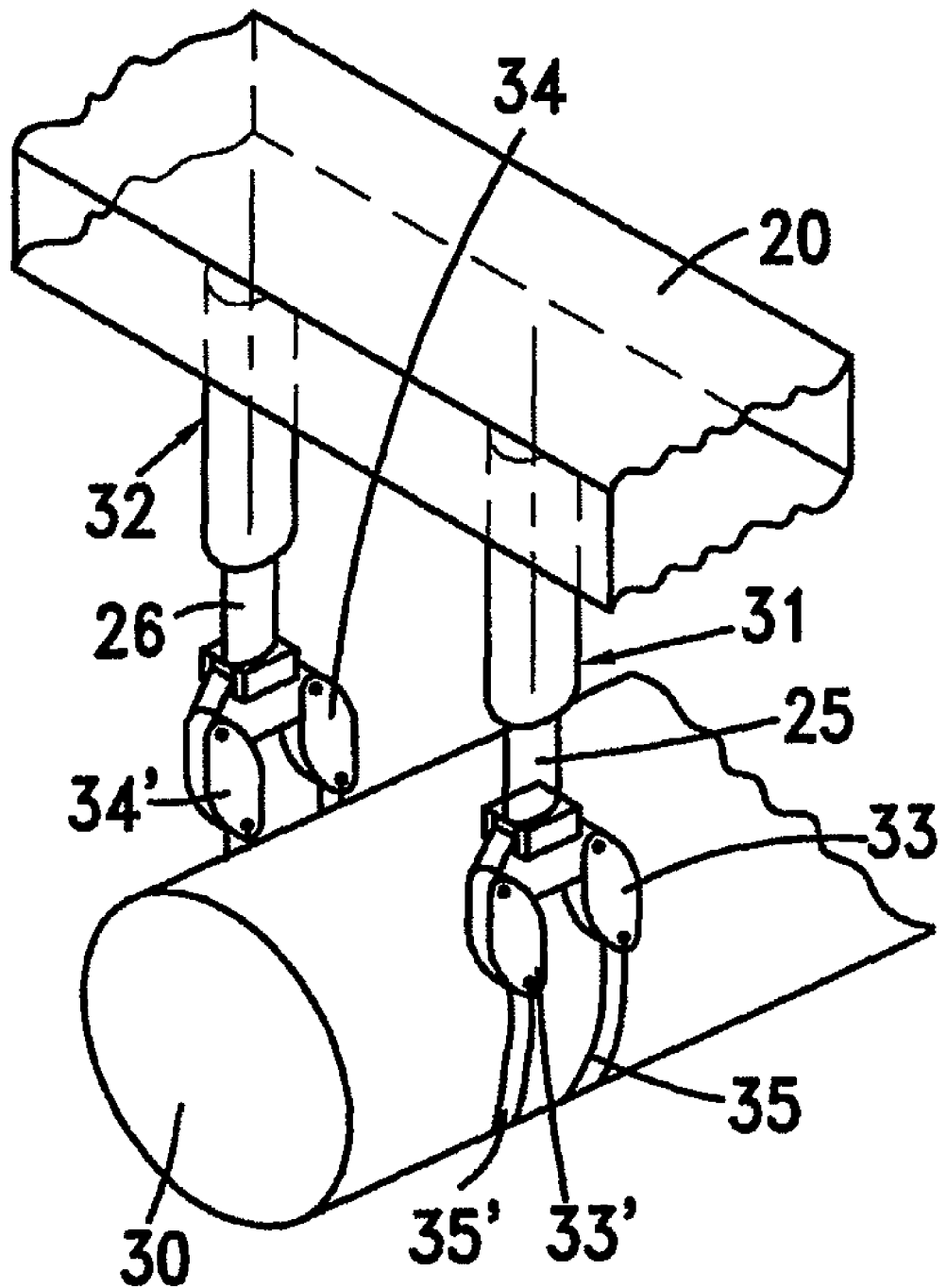
FIG. 7 is a perspective detail of the lifting apparatus.
Figure 8:
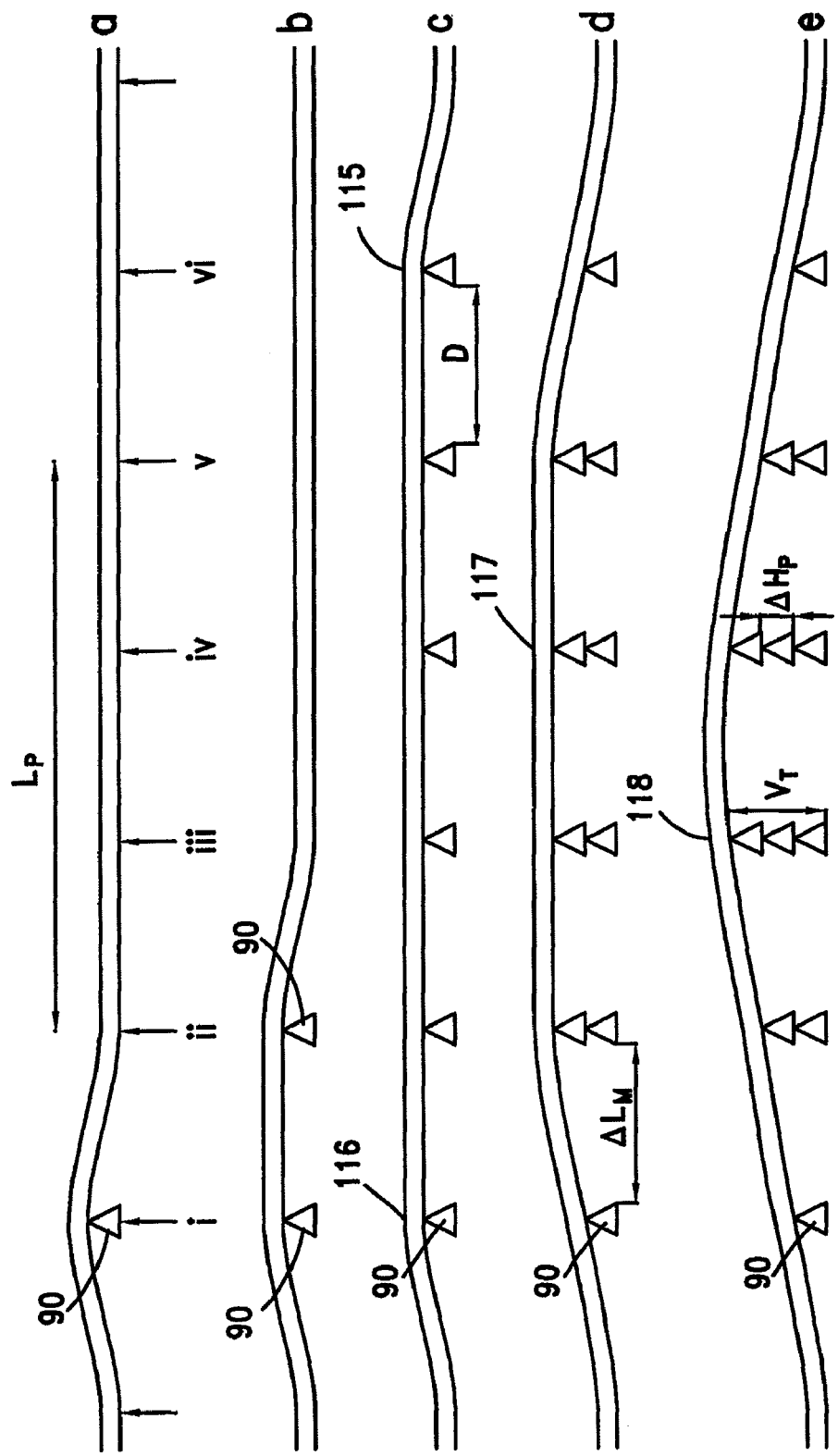
FIGS. 8a to 8e schematically illustrate the pipeline lifting procedure.

In the transverse beam 20 are housed cylinders 23 and 24 respectively of two hydraulic, extendable lifting arms, generally indicated at 31 and 32, which comprise pistons 25 and 26 respectively. Said pistons are bidirectional pistons which can extend and retract with sufficient power. The lifting arms also comprise lifting fingers attached to said pistons, for connecting thereto a chain 29 which is adapted to be placed about the pipeline, the cross-section of which is illustrated at 30. Said fingers are schematically indicated in FIGS. 1, 5 and 6 as rings 27 and 28, but may, and generally will have different structures, an example of which is given in FIG. 7. In said example, each piston 25-26 is connected to a pair of clips 33-33' and 34-34' respectively, to which are attached two chains 35-35', or other belts, which are placed around the lower half of pipe 30.

The operation of the apparatus is as follows. The apparatus is placed in the trench astride the pipeline, as seen in FIG. 1. A few centimeters are removed from the trench bed under the section of the pipe that has to be engaged by the lifting apparatus, and the chain 29 (or the pair of chains 35-35' or belts) is passed underneath the pipe and is connected to the lifting fingers 27 and 28 (or 33-33' and 34-34'). Then the hydraulic apparatus 18 and 19 are actuated so as to extend the telescopic legs 12 and 13 until the chain 29 is tight or the chains 35-35' or belts are tight. The actuation of the hydraulic apparatus also serves to set the lifting frames in the proper positioned relationship to the trench, with their legs vertical as far as possible. The power of the hydraulic systems 18 and 19 is so limited that they can cause the legs 12 and 13 to be telescopically extended to place the frame in a correct positioned relationship to the trench and to tighten the chain or chains or belts, but they cannot raise the pipe, the weight of which is in the order of tens of tons and is much greater than that of the lifting frames. What has been said of one lifting frame applies to both of them, when the apparatus comprises two lifting frames, as in this embodiment.

Thereafter, the lifting arms are hydraulically actuated so as to retract and lift the pipe 30 (see FIG. 6). The apparatus is so dimensioned that the entire stroke of the lifting arms is 22 cm or whatever other amount might be determined by international standards. The apparatus cannot lift the pipe by more than said amount, because its stroke is structurally limited, by any suitable structural means, and cannot be exceeded as a result of operating errors. For example, the piston of the lifting arm may be so manufactured so that its stroke is only 22 cm.

The hydraulic pumps which supply the lifting power to the telescopic legs on the one hand and to the lifting arms on the other hand, are mutually independent. In this way it can be guaranteed that the power of the telescopic legs will always be well below that necessary to lift the pipe.

Figure 4A:
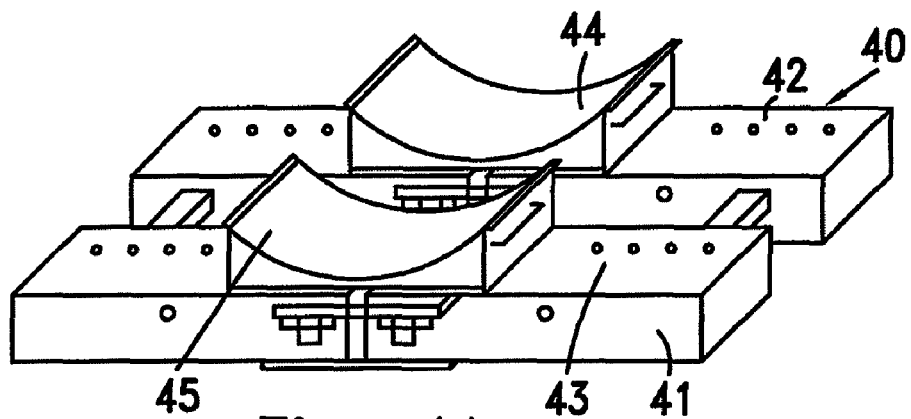
FIGS. 4A, B and C are schematic perspective views of three successive stages of the installation of a support for a lifted section of the pipeline.
Figure 4B:
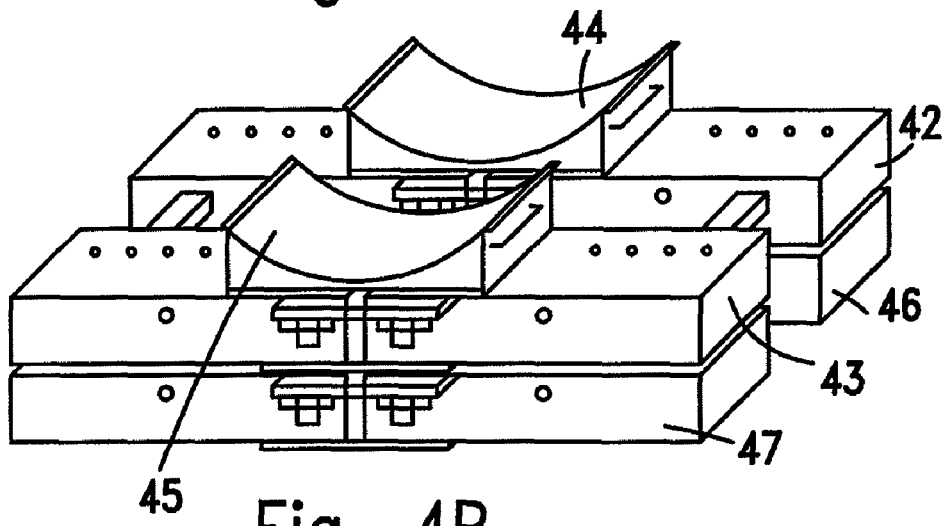
Figure 4C:
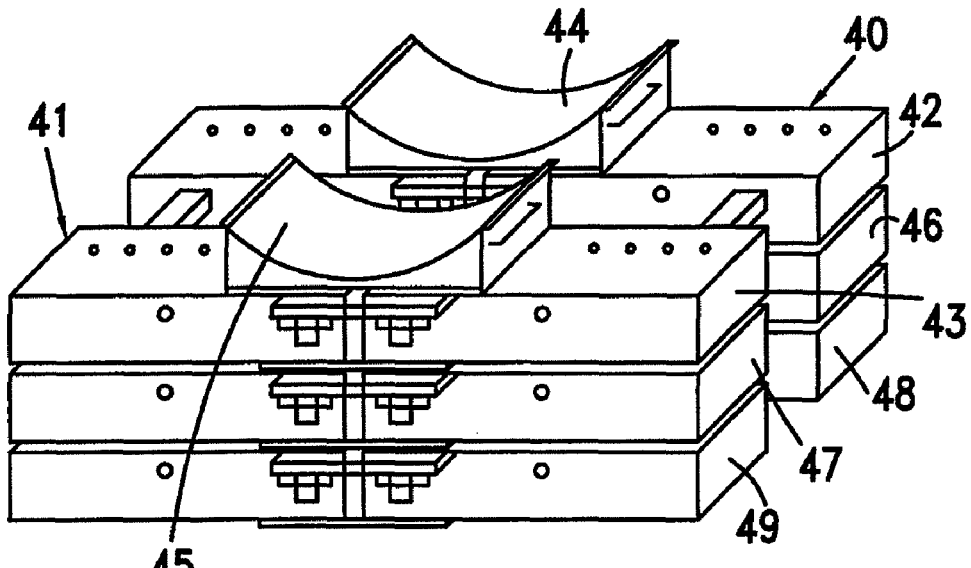

At this point, it is necessary to support the bottom of the pipe in the way illustrated in FIGS. 4A, B and C. Initially, as in FIG. 4A, two supports 40 and 41 are placed under the pipe. Each support comprises a parallelepipedal portion 42-43 and a concave portion 44-45 shaped as a cradle to conform to the surface of the pipe. Thereafter, as the pipe is further raised, two additional parallelepipedal elements 46 and 47 are placed under elements 40 and 41, as shown in FIG. 4B. Subsequently, two more parallelepipedal elements 48 and 49 can be placed under elements 46 and 47, as shown in FIG. 4C. The use of these stackable supports during the maintenance procedure has been described hereinbefore and schematically illustrated in FIGS. 8a to 8e.

Figure 12:
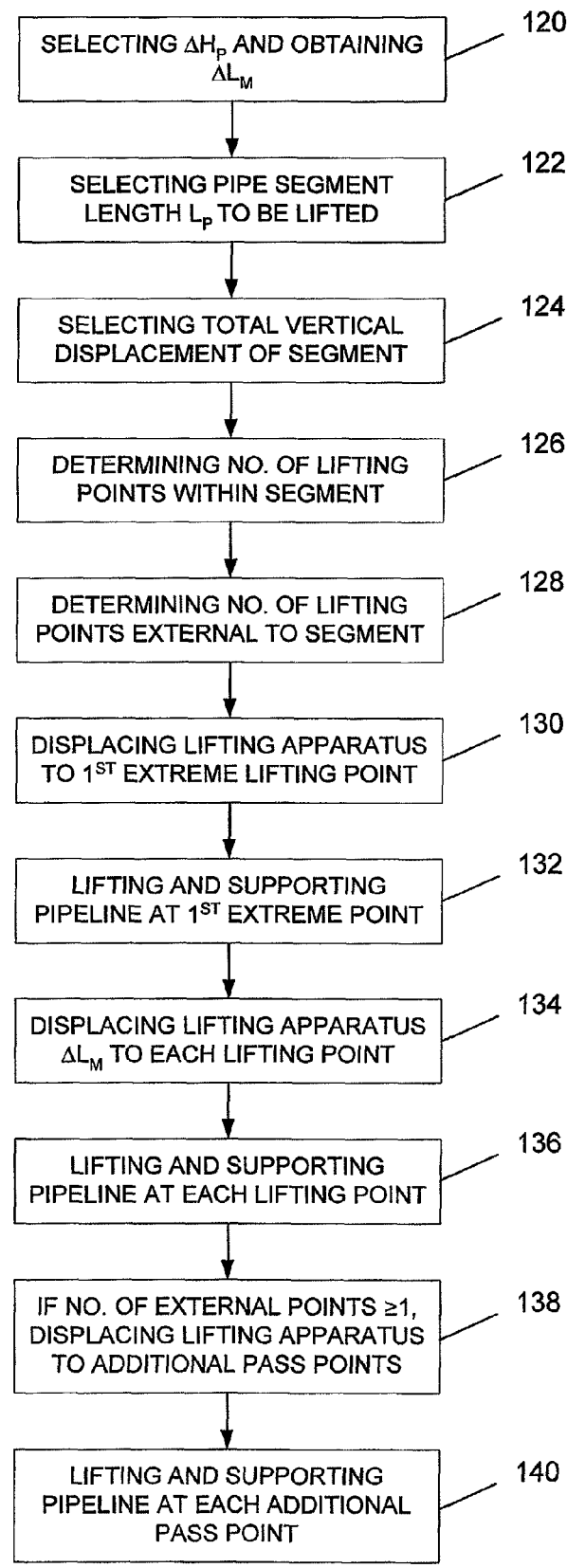
FIG. 12 is a flow chart of a method according to one embodiment of the invention for lifting pipelines with the use of lifting apparatus and a system of stackable supports.

FIG. 12 illustrates a method for lifting pipelines with use of the lifting frames and a system of stackable supports, according to a preferred embodiment of the invention. When the following method is implemented, a pipeline segment may be advantageously lifted to any desired height, in order to perform a maintenance operation thereto while complying with international flexibility standards.

Prior to a lifting operation, a permissible vertical displacement value $\Delta H_P$ of points to be lifted along a given exposed pipeline, through which a hazardous fluid flows or is capable of flowing, is selected in step 120. The permissible vertical displacement value $\Delta H_P$ is selected in accordance with a suitable flexibility standard for the diameter, strength and weight of the pipeline, such that the difference in height of any two adjacent points that are to be lifted will be less than $\Delta H_P$. The flexibility standard also provides, based on the selected $\Delta H_P$ value, a maximum longitudinal dimension $\Delta L_M$ between two adjacent points of the pipeline. A length of a pipeline segment $L_P$, on which a maintenance operation will be performed after a portion thereof is lifted to a maximum extent, is selected in step 122. The desired total vertical displacement $V_T$ to which a portion of the selected pipeline segment $L_P$ is to be lifted to said maximum extent is selected in step 124.

In step 126, a first number $n_1$ of required lifting points within selected pipeline segment $L_P$ is calculated according to the equation:

$$n_1 > (L_P/\Delta L_M), \quad \text{(Equation 1)}$$

where $n_1$ is the smallest integer greater than the ratio between selected pipeline segment length $L_P$ and maximum longitudinal dimension $\Delta L_M$. In step 128, a second number $n_2$ of required lifting points external to pipeline segment $L_P$ in each longitudinal direction is calculated according to the equation:

$$(n_2 \geq (V_T/\Delta H_P)) - 1, \quad \text{(Equation 2)}$$

where $n_2$ is the smallest integer greater than, or equal to, the ratio between selected total vertical displacement $V_T$ and permissible vertical displacement value $\Delta H_P$, reduced by 1.

The pipeline lifting apparatus is then displaced in step 130 to a first extreme lifting point which is disposed at a distance D equal to the product of second number $n_2$ and maximum longitudinal dimension $\Delta L_M$, in a first longitudinal direction from pipeline segment length $L_P$, calculated according to the equation:

$$D = n_2 * \Delta L_M \quad \text{(Equation 3)}$$

The pipeline is then lifted in step 132 by the lifting apparatus at the first extreme lifting point by selected vertical displacement value $\Delta H_P$, after which a support, preferably configured with a concave portion, is inserted below the pipeline at the first extreme lifting point. The lifting apparatus is then displaced in step 134 by a distance equal to maximum longitudinal dimension $\Delta L_M$ towards a second extreme lifting point. The pipeline is lifted at the corresponding lifting point in step 136 by a distance equal to the selected vertical displacement value $\Delta H_P$, and then a stackable support is inserted below the pipeline at the corresponding lifting point. The second extreme lifting point is disposed at a distance, in a second longitudinal direction from selected pipe segment $L_P$, equal to the product of second number $n_2$ and maximum longitudinal dimension $\Delta L_M$. Steps 134 and 136 are performed for the total number of lifting points $n_3$ calculated according to the equation:

$$n_3 = n_1 + 2(n_2) \quad \text{(Equation 4)}$$

until a support is inserted at the second extreme lifting point.

If the selected total vertical displacement $V_T$ is sufficiently high such that $n_2$ is greater than, or equal to, 1, the pipeline needs to be supported by multiple layer supports in order to ensure its structural integrity. In order to provide multiple layer supports, the lifting apparatus is sequentially displaced in step 138 from the second extreme lifting point to each second pass lifting point, for a distance equal to maximum longitudinal dimension $\Delta L_M$, towards the first extreme lifting point. As referred to herein, "a second pass lifting point", or any other numbered pass point, means a lifting point at which a support has already been inserted following a lifting operation and at which an additional support will be inserted to provide a multiple layer support. At each second pass lifting point to which the lifting apparatus is displaced, the pipeline is lifted in step 140 by selected vertical displacement value $\Delta H_P$ and a second suitable stackable support is inserted thereat under the first support. Steps 138 and 140 are performed for the total number of second pass lifting points $n_4$ calculated according to the equation:

$$n_4 \geq (n_1 + 2(n_2)) - 2, \quad \text{(Equation 5)}$$

where $n_4$ is the greatest integer greater than, or equal to, the sum of first number $n_1$ and twice second number $n_2$, reduced by two, since an additional support is not inserted at the first and second extreme lifting points.

Similarly, if $n_2$ is greater than, or equal to, 2, the lifting apparatus is sequentially displaced to one or more third pass lifting points, after a support is inserted at all second pass lifting points, for a distance equal to maximum longitudinal dimension $\Delta L_M$ towards the second extreme lifting point. The pipeline is lifted at each of the third pass lifting points and a third suitable stackable support is inserted thereat under a corresponding second support. The total number of third pass lifting points is equal to the greatest integer greater than, or equal to, the sum of $n_1$ and twice $n_2$, reduced by four. If need be, the lifting apparatus is sequentially displaced to fourth pass, or any other number of additional pass points, in order to perform a lifting operation.

The various parameters that define the aforementioned method, including pipeline segment $L_P$, maximum longitudinal dimension $\Delta L_M$, selected vertical displacement value $\Delta H_P$, total vertical displacement $V_T$, distance D from pipeline segment $L_P$ to first and second extreme lifting points 115 and 116, respectively, second pass lifting points 117, and third pass lifting points 118, are indicated in FIG. 8*a-e*.

For example, for a pipeline having an outer diameter of 42 in, made of carbon steel St 37.2 having a tensile strength of 360-500 MPa and a yield point of 235 MPa [http://www.e-pipe.co.kr/eng/BS/3601.htm] and a weight of 1000 kg/m with petroleum flowing therethrough, the maximum vertical displacement value is 22 cm and the maximum longitudinal dimension $\Delta L_M$ is 30 m, as specified in API Recommended Practice 1117, First Edition, February, 1993.

Based on this flexibility standard, the selected vertical displacement value $\Delta H_P$ is 20 cm, the selected total vertical displacement $V_T$ is 60 cm, and the selected segment length $L_P$ to which a maintenance operation is desired to be performed is 90 m. The first number $n_1$ of required lifting points within selected pipeline segment $L_P$ is 4, as calculated according to Equation 1. The second number $n_2$ Of required lifting points external to pipeline segment $L_P$ in each longitudinal direction is 2, as calculated according to Equation 2. First and second extreme lifting points 115 and 116 are located at a distance D of 60 m from pipeline segment $L_P$, as calculated according to Equation 3. The total number of lifting points $n_3$ is 8, as calculated according to Equation 4. The total number of second pass lifting points is 6, as calculated according to Equation 5. The total number of third pass lifting points is 4.

Figure 9:
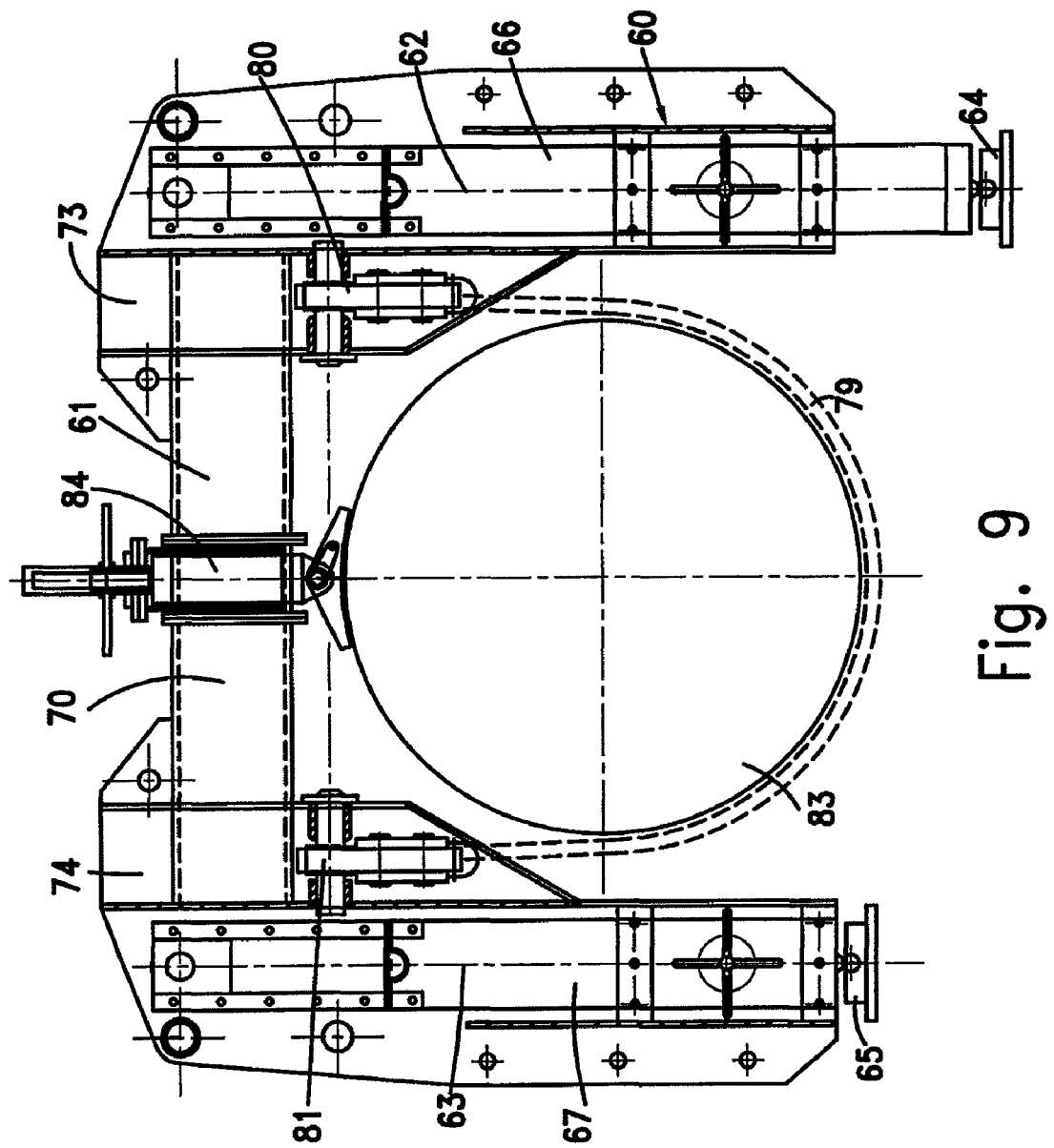
FIG. 9 is a schematic vertical view of an apparatus according to another embodiment of the invention, seen from a plane perpendicular to the axis of the pipeline.
Figure 10:
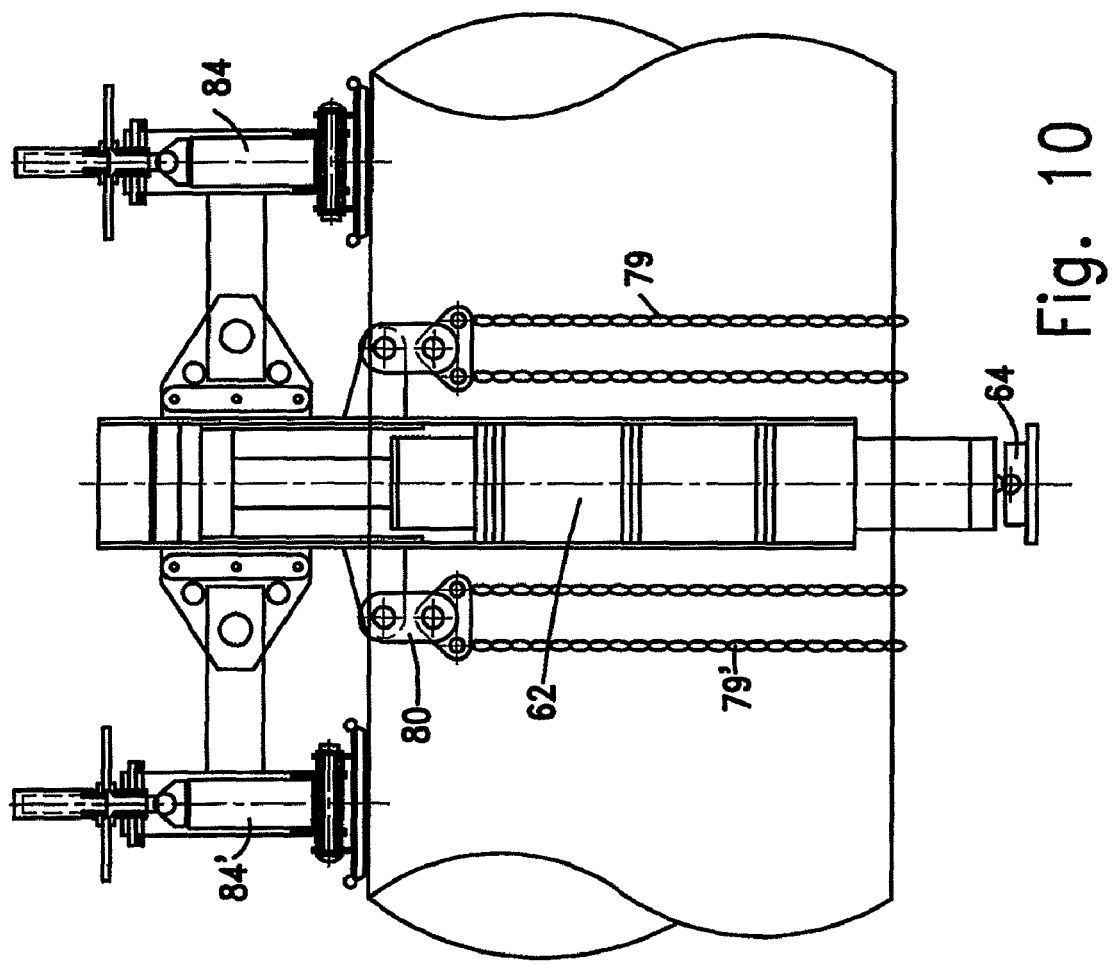
FIG. 10 is a schematic vertical view of the apparatus of FIG. 9, seen from a plane parallel to the axis of the pipeline.

FIGS. 9 and 10 illustrate another embodiment of the invention. This comprises two lifting frames that are equal and parallel to each other, one of which is generally indicated at 60 in FIG. 9. They are interconnected by a beam such as 11 in FIG. 3. When the apparatus is placed in the pipeline trench, the frames are perpendicular to the trench and consequently the beam is parallel to the trench. The frame shown in FIG. 9 comprises two telescopic legs 62 and 63. Each leg rests on a foot, 64 and 65 respectively, to which are connected pistons 66 and 67 respectively, actuated by hydraulic systems. Legs 62 and 63 are connected by a transverse beam 70 to which may be connected a link for lifting the frame by means of a crane. The operation of this embodiment is essentially the same as that of the embodiment of FIGS. 1 to 7.

The transverse beam 70 supports cylinders 73 and 74 respectively of two hydraulic, extendable lifting arms generally indicated at 80 and 81. The lifting arms are connected, in any suitable way, to a chain 79 (shown in broken lines in FIG. 9) which is adapted to be placed about the pipeline, the cross-section of which is illustrated at 83. FIG. 10 shows two such chains 79 and 79'. Two hydraulic fingers 84 and 84' engage the top of the pipe to steady it.

Figure 11:
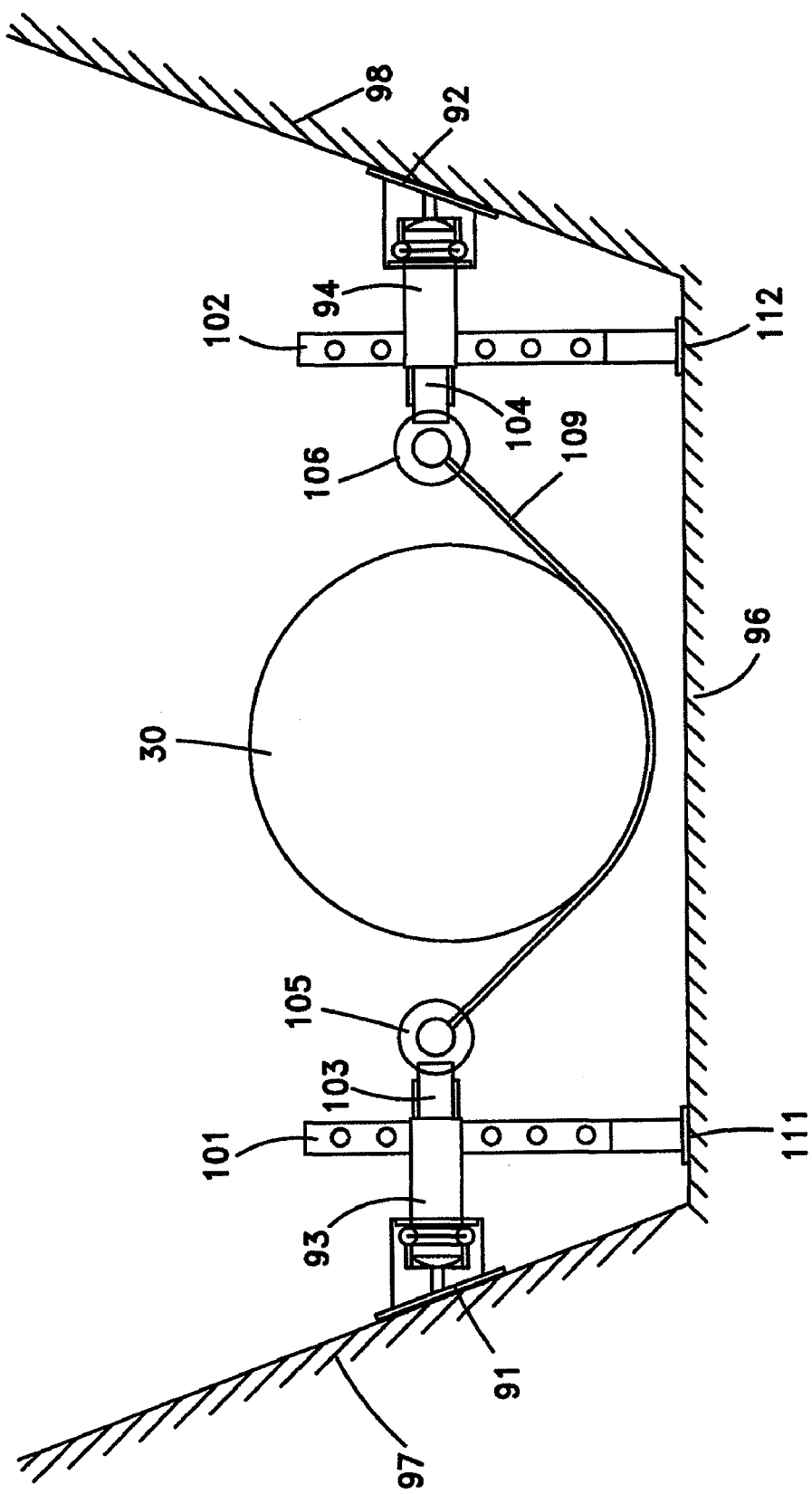
FIG. 11 is a schematic vertical view of an arrangement for laterally supporting a pipeline according to an embodiment of the invention, seen from a plane perpendicular to the axis of the pipeline.

FIG. 11 illustrates an arrangement for laterally supporting a pipeline, according to another embodiment of the invention. Pipeline 30 is shown to be suspended within a trench after being raised by the lifting apparatus of the invention, and is sufficiently exposed to carry out the required maintenance operations. The arrangement includes lateral supports 91 and 92 disposed on opposite sides of pipeline 30, the corresponding cylinder of hydraulically extendible arms 93 and 94 to which lateral supports 91 and 92 are pivotally connected, respectively, and mounted on jack means 101 and 102, respectively, bi-directional pistons 103 and 104 associated with arms 93 and 94, respectively, rings 105 and 106 attached to pistons 103 and 104, respectively, and flexible chain 109 connected between rings 105 and 106 and placed about pipeline 30. Opposed trench sides 97 and 98 provide a reactive force to lateral supports 91 and 92, respectively, and trench bottom 96 provides a reactive force to bases 111 and 112 of jack means 101 and 102, respectively. Jack means 101 and 102 or any other suitable assembly well known to those skilled in the art are employed for raising the corresponding cylinder to a height corresponding to that of pipeline 30, after the latter has been raised by the lifting apparatus of the invention. Jack means 101 and 102 are placed on trench bottom 96 at an intermediate position between two adjacent points shown in FIG. 8*a*. As pipeline 30 is raised by the lifting apparatus of the invention, arms 93 and 94 are extended until supports 91 and 92 engage trench sides 97 and 98, respectively, thereby applying a tensile force to chain 109 which is sufficient to guarantee the proper alignment of pipeline 30.

While embodiments of the invention has been shown has been described by way of illustration, it will be understood that the invention may be carried into practice with many modifications, variations and adaptations, without departing from its spirit or exceeding the scope of the claims.

The invention claimed is:

1. Apparatus for lifting a pipeline to allow for maintenance of the pipeline, the apparatus comprising:
   a) at least one lifting frame, the lifting frame having telescopic legs and a transverse top beam connecting the legs;
   b) telescopic lifting arms supported by said top beam;
   c) flexible means connected to said lifting arms for engaging the bottom of the pipeline, the lifting arms being retractable to lift the pipeline at a location where the flexible means engages the bottom of the pipeline;
   d) first hydraulic means for telescopically extending and retracting said legs of the lifting frame, wherein the first hydraulic means has insufficient power to extend said legs to lift the pipeline;
   e) second hydraulic means independent from the first hydraulic means for telescopically extending and retracting said lifting arms to lower and lift the pipeline; and
   f) a support in contact with the pipeline at the corresponding lifting location, the support including a plurality of stackable elements including a concave element for engaging the bottom of the pipeline wherein the concave element has a substantially similar curvature as that of the pipeline to conform to the surface of the pipeline and at least one parallelepipedal element under the concave element.

2. The apparatus according to claim 1, wherein the flexible means is selected from the group consisting of chains or belts.

3. The apparatus according to claim 1, wherein the by telescopic lifting arms have an entire stroke not greater than 22 cm.

4. The apparatus according to claim 1, wherein said at least one lifting frame comprises exactly one lifting frame.

5. The apparatus according to claim 1, wherein said at least one lifting frame comprises two parallel lifting frames, so as to exercise the lifting action on a short length of pipeline comprised between said two parallel frames.

6. The apparatus according to claim 1, with further comprising a plurality of lateral supports adapted to be placed on the sides of the pipeline and to be operatively connected thereto by flexible means, said lateral supports being provided with extendable arms for engaging the sides of a trench in which the pipeline is situated.

7. The apparatus according to claim 6, wherein said at least one lifting frame comprises two parallel lifting frames, said two parallel lifting frames are connected to one another and are each attached to a common element for lifting them and transferring them from one location to another.

\* \* \* \* \*

UNITED STATES PATENT AND TRADEMARK OFFICE
CERTIFICATE OF CORRECTION

| | | |
|---|---|---|
| PATENT NO. | : 7,845,881 B2 | Page 1 of 1 |
| APPLICATION NO. | : 11/773785 | |
| DATED | : December 7, 2010 | |
| INVENTOR(S) | : Kline | |

It is certified that error appears in the above-identified patent and that said Letters Patent is hereby corrected as shown below:

Title page, please insert items (86) and (87) as follows:

--(86) PCT No.: PCT/IL01/00442
§ 371 (c)(1), (2), (4) Date: May 17, 2001

(87) PCT Pub. No.: WO 01/90623
PCT Pub. Date: November 29, 2001--.

Signed and Sealed this
First Day of March, 2011

David J. Kappos
*Director of the United States Patent and Trademark Office*